(12) United States Patent
Paranjpe et al.

(10) Patent No.: US 9,767,155 B1
(45) Date of Patent: Sep. 19, 2017

(54) ORGANIZING ANALYTICALLY RELEVANT INFORMATION CONTEXTUALLY FOR EFFICIENT PRESENTATION

(71) Applicants: Parag Paranjpe, Mountain View, CA (US); Gopinath Sundharam, San Jose, CA (US); Manikandan Sundaram, San Jose, CA (US)

(72) Inventors: Parag Paranjpe, Mountain View, CA (US); Gopinath Sundharam, San Jose, CA (US); Manikandan Sundaram, San Jose, CA (US)

(73) Assignee: Health Level, Inc., Mountain View, CA (US)

( * ) Notice: Subject to any disclaimer, the term of this patent is extended or adjusted under 35 U.S.C. 154(b) by 0 days.

(21) Appl. No.: 14/857,670

(22) Filed: Sep. 17, 2015

Related U.S. Application Data

(63) Continuation of application No. 13/714,329, filed on Dec. 13, 2012, now Pat. No. 9,348,876.

(60) Provisional application No. 61/570,250, filed on Dec. 13, 2011.

(51) Int. Cl.
*G06F 17/30* (2006.01)

(52) U.S. Cl.
CPC .. *G06F 17/30528* (2013.01); *G06F 17/30867* (2013.01)

(58) Field of Classification Search
CPC ......... G06F 17/30067; G06F 17/30569; G06F 17/30864
USPC ........ 707/634, 706, 707, 721, 722, 756, 805
See application file for complete search history.

(56) References Cited

U.S. PATENT DOCUMENTS

| | | | |
|---|---|---|---|
| 5,047,930 A | 9/1991 | Martens et al. | |
| 5,299,118 A | 3/1994 | Martens et al. | |
| 9,171,273 B2* | 10/2015 | Thomas | G06Q 10/06 |
| 9,348,876 B1* | 5/2016 | Paranjpe et al. | 707/722 |
| 2006/0080141 A1 | 4/2006 | Fusari et al. | |
| 2010/0114960 A1 | 5/2010 | Fusari et al. | |
| 2010/0313145 A1* | 12/2010 | Dillenberger | G06Q 10/06 715/757 |

(Continued)

OTHER PUBLICATIONS

Vitharana et al., Knowledge-based repository scheme for storing and retrieving business components: Atheorical design and an empirical analysis, 2003, 649-664.*

(Continued)

*Primary Examiner* — Jean B Fleurantin

(57) ABSTRACT

Processing information relevant analytically to a user's endeavor is described. Data, gathered in relation to the analytically relevant information, is organized into a first result that is sensitive to an endeavor-related context. A synoptic representation of the contextually sensitive first result is presented, with which the user may interact. The first synoptic representation is expanded into a second result, which has a graphical or numerical data attribute. The expansion includes determining a format that best, or most efficiently, represents the second result in relation to the context sensitivity and the graphical or numerical data attribute. A representation of the second result is presented according to the determined best or more efficient format. The first results second results presentations are linkable to underlying data sets that correspond to the organized data for access and presentation upon the user's request.

18 Claims, 14 Drawing Sheets

(56) References Cited

U.S. PATENT DOCUMENTS

| | | | |
|---|---|---|---|
| 2012/0030341 A1* | 2/2012 | Jensen | H04L 67/2804 709/224 |
| 2012/0209468 A1* | 8/2012 | Thomas | G07C 5/006 701/29.1 |
| 2013/0219272 A1* | 8/2013 | Balasubramanian ... | G06F 3/023 715/704 |

OTHER PUBLICATIONS

Vitharana et al., Knowledge-based repository scheme for storing and retrieving business components: a theoretical design and an empirical analysis, IEEE, 2003, 649-664.*

* cited by examiner

Example Workspace Notations Screenshots 201

Example Summary Visual Unit Screenshots 301

All Sites Monthly Billing
Confidential to Management

Refresh • Notes • Workspace Actions ▼

| Summary View | | | | | |
|---|---|---|---|---|---|
| Last Months Summary• info | Refresh | Actions ▼ | Summary Last Quarter • info | Refresh | Actions ▼ |
| Total Procedure Count | 22839 | OK | Total Procedure Count | 69475 | -no rubric- |
| Total Professional Charge | $2,735,002 | -no rubric- | Total Professional Charge | $7,890,892 | -no rubric- |
| Total Number of Billable Exams | 22839 | -no rubric- | Total number of Billable Exams | 69475 | High |
| Average Post-Procedure Duration | 4d:10h:4mi | -no rubric- | Average Post-Procedure Duration | 4d:10h:30mi | -no rubric- |
| Procedure Count Waiting >30 minutes • info | Refresh | Actions ▼ | | | |
| Total Procedure Count | 9210 | -no rubric- | | | |

FIG. 3A

Monthly All Site Exam                                                                 Table

| Measures | Add | | Filters | Add | | Organize Rows | Add |
|---|---|---|---|---|---|---|---|
| Professional Charge | | x | Report Finalized Date | | x | Organize Columns | Add |
| Total | | | Previous [1] month(s) | | | | |
| Procedure Count | | x | | | | | |
| Total | | | | | | | |
| Post-Procedure Count | | x | | | | | |
| Average | | | | | | | |

Save | Save As                                                   [ Redraw ]  [ Cancel ]

| Total Professional Charge | $2,777,197 | - no rubic - |
|---|---|---|
| Total Procedure Count | 23191 | - no rubic - |
| Average Post-Procedure Duration | 4d:10h:22mi | - no rubic - |

| Monthly All Site Exam | | | Table |
|---|---|---|---|
| Measures Add | Filters Add | Organize Rows Add | |
| Professional Charge / Total  x | Report Finalized Date / Previous [1] month(s)  x | Organize Columns Add | |
| Procedure Count / Total  x | | | |
| Post-Procedure Count / Average  x | | | |
| Save \| Save As | | Redraw  Cancel | |
| Total Professional Charge | | $2,777,197 | - no rubic - |
| Total Procedure Count | | 23191 | - no rubic - |
| Average Post-Procedure Duration | | 4d:10h:22mi | - no rubic - |

FIG. 3C

Example Table Presentation Screenshot 400

| Monthly All Site Exams | | | Bar: Table |
|---|---|---|---|
| Measures Add <br> Professional Charge <br> Total <br><br> Procedure Count <br> Total <br><br> Post-Procedure Count <br> Average | Filters Add <br> Report Finalized Date <br> Previous [1] month(s) | Organize Rows Add <br> Order Placed Location <br> -no bin- <br><br> Organize Columns Add | |
| Save \| Save As | | Redraw Cancel | |

| Order Place Location | Total Professional Charge | Total Procedure Count | Average Post-Procedure Duration |
|---|---|---|---|
| Coronary Care | $240,336 | 2056 | 4d:9h:9mi |
| Day Surgery | $244,953 | 2081 | 4d:10h:27mi |
| East Tower Maternity | $250,445 | 2036 | 4d:11h:57mi |
| ED | $272,763 | 2229 | 4d:9h:45mi |
| Geriatric | $238,467 | 2068 | 4d:9h:14mi |
| ICU | $247,028 | 2073 | 4d:11h:14mi |
| NICU | $256,671 | 2150 | 4d:11h:1mi |
| Phys Pavillion | $260,230 | 2148 | 4d:10h:24mi |
| PICU | $255,203 | 2141 | 4d:10h:48mi |
| Urgent Care | $267,537 | 2202 | 4d:9h:42mi |
| Grand Totals, etc. | $2,777,197 | 23191 | 4d:10h:22mi |

Show [10 ▼] rows   1-10 of 11 ◄ ►

FIG. 4

Example Drillthrough Screenshot 600 (from Table)

| Central Office | Summary View | | | | | | | | |
|---|---|---|---|---|---|---|---|---|---|
| Cindy's Private Workspace | Last Months Summary • info | | Refresh | Actions ▼ | Summary Last Quarter • info | | Refresh | Actions ▼ | |
| Community | Total Procedure Count | 22839 | | OK | Total Procedure Count | 69475 | | -no rubric- | |

Detailed Information                                                                                                                            X

| Accession Number | MRN | Patient Type | Modality Type | Priority | Body Part | Pre-Procedure Duration | Wait Duration | In-Procedure Duration | Post-Procedure Duration | Exam Originating Site | Performing Resource | Technical RVU | Professi RVU |
|---|---|---|---|---|---|---|---|---|---|---|---|---|---|
| 4872096587220110907 | **** | OutPatient | NM | ROUTINE | Brain | - | - | - | 19h:45mi | Main Hospital | MH-NM-1 | 0 | |
| 4942430175320110920 | **** | OutPatient | MR | URGENT | Bone | - | 1mi | 6mi | 12d:7h:35mi | Main Hospital | MH-MR-1 | 25.14 | |
| 4947481084220110924 | **** | OutPatient | CT | ROUTINE | Tissue | - | 25mi | 3mi | 5d:2h:4mi | Imaging Center | IC-CT-1 | 0 | |
| 4952185419320110927 | **** | OutPatient | NM | ROUTINE | Bone | - | - | - | 6d:8d:23mi | Main Hospital | MH-NM-1 | 10.46 | |
| 4952186582220110927 | **** | OutPatient | NM | URGENT | GI Tract | - | - | - | 6d:5h:3mi | Main Hospital | MH-NM-1 | 13.49 | |
| 4963841005220110910 | **** | OutPatient | US | ROUTINE | Abdomen | - | - | - | 5d:1h:32mi | Main Hospital | MH-US-1 | 4.27 | |
| 4966045001220110913 | **** | OutPatient | US | URGENT | Fetal | - | - | - | 3d:2h:0mi | Main Hospital | MH-US-1 | 5.59 | |
| 4988604500120110914 | **** | OutPatient | US | URGENT | Fetal | - | - | - | 3d:2h:0mi | Main Hospital | MH-US-1 | 5.59 | |
| 4995495539920110908 | **** | OutPatient | NM | STAT | MSK | - | - | - | 2d:8h:19mi | Main Hospital | MH-NM-1 | 0 | |
| 4995496702220110908 | **** | OutPatient | NM | ROUTINE | Other | - | - | - | 2d:5h:35mi | Main Hospital | MH-NM-1 | 0 | |

1-10 of 22839 ▼ ▲   Export   Close

FIG. 6

ORGANIZING ANALYTICALLY RELEVANT INFORMATION CONTEXTUALLY FOR EFFICIENT PRESENTATION

RELATED APPLICATIONS

The present Application claims benefit of and priority to co-pending U.S. patent application Ser. No. 13/714,329, filed on Dec. 13, 2012, which claims priority to U.S. Provisional Patent Application No. 61/570,250, filed on Dec. 13, 2011, entitled: 'The System that Allows Non-computer Experts to Express Deep Analytical Questions in a Browser Based Interface and Get the Answer in the Same Interface.' The entire content of the foregoing patent applications are herein incorporated by reference for all purposes.

TECHNOLOGY

The inventive embodiments described herein relate broadly to processing information. More particularly, an embodiment of the present invention relates to organizing analytically relevant information contextually for efficient presentation.

BACKGROUND OF THE INVENTION

Contemporary endeavors and enterprises such as health care settings, e.g., hospitals, surgical centers, medical service centers, professional medical, dental, etc. offices, networks, affiliations, associations and other establishments use, generate and secure vast amounts of information. Such information comprises real, raw and/or filtered/unfiltered data, which is stored, updated, maintained and/or secured in and accessed from a variety of databases, data warehouses, business intelligence (BI) milieus, storage area network (SAN)s, Network Area Storage (NAS), etc.

In computing, providing, user-accessing (e.g., querying, etc.)—and often simply using such data, a significant level of expertise in one or more of a variety of technologies may be typically useful. For example, expertise in one or more of these example technologies may provide significant value: computing, database management, networking, Information Technology (IT) and/or information handling and retrieval, and in fact in some applications even Library Science (LS) and information retrieval.

Medical and other fields that demand technological sophistication often involve complex personal issues that relate to human interrelationships, demographic and socio-economic factors and related information. This, in addition to the technological sophistication and complexities of the underlying bio-medical, physiological, psychological, dental, pharmacological, financial and related issues in any given case. Thus, non-trivial levels of expertise in software, the semantics of relational databases and other skills are often useful in formulation queries and otherwise accessing data in the users' fields.

Yet, professionals and technicians in fields like health care and the medical arts are often extremely rushed, stressed, and challenged with the demands of their own specialties and responsibilities to focus, when they need important contextually relevant answers in real time or near-real time, on otherwise ancillary software skills and the formalities of database semantics. Moreover, the substance, context and/or details of subsequent queries may change significantly in real time or near-real time, according to results of earlier queries. For instance, interested professionals in various fields may ask different questions, based on answers extracted from the results of earlier queries. The value of e-mailed reports and Web-presented charts may thus have a brief, even mercurial or an ethereal "shelf-life." This temporal information value diminution may be exacerbated by a trust deficit that recipient/users may hold in data, which underpin the presentation.

Moreover, to maximize their use of the wealth of information resources, computational, networking and database assets available in an endeavor as complex as a modern health care system, health care and other professionals/technicians in specialty fields, which do not necessarily focus on IT, typically interface with one or more IT specialists. For instance, consider that even formulating effective queries with correct database syntax can be a challenging task for a heart surgeon in a rush to access important clinical data. "Call IT" is a not uncommon refrain in such circumstances. The IT specialists may "tune and teach," e.g., more-or-less custom "tune" the information resources for the non-IT users to most effectively utilize them and, even to add new data types, protocols, extensions, etc., and "teach" the non-IT users how to apply the custom-tuned settings or features. However, this IT specialist interactivity can add significant latency; days, even weeks can pass before fresh updated data retrieval is available to the non-IT users.

Approaches described in this section could, but have not necessarily been conceived or pursued previously. Unless otherwise indicated, neither approaches described in this section, nor issues identified in relation thereto are to be assumed as recognized in any prior art merely by inclusion therein.

BRIEF SUMMARY OF THE INVENTION

An example embodiment of the present invention relates to a method for processing information, which is relevant analytically to an endeavor of a user. Data is organized, which is gathered in relation to the analytically relevant information, into a first result that is sensitive to a context that relates to the endeavor. A representation of the contextually sensitive first result is presented, which is synoptic in relation thereto and, with which the user may interact. The first synoptic representation is expanded into a second result, which includes one or more of a graphical data attribute or a numerical data attribute. The expansion includes determining a format that represents the second result in relation to the context sensitivity and the graphical or numerical data attribute. A representation of the second result is presented according to the determined representative format. The first results presentation and the second results presentation are linkable to underlying data sets that correspond to the organized data for access and presentation upon a request by the user.

The second result representation format may include a table, which presents the numerical data attribute, or a chart, which presents the graphical data attribute. The synoptic and expanded presentations may function as workspaces. A level of the contextual sensitivity, a characteristic of the contextual sensitivity and/or the format that represents the second result are controllable by an interaction with the user, which may include an input to one or more of a graphical user interface (GUI), such as a web browser or a mobile device interface. The includes a palette, which presents for selection by the user, one or more measures or filters that correspond to a feature or event, which is captured or recorded from a network that is related to the endeavor. The palette presents the measures or the filters based on metadata. The metadata is captured by multiple listeners, which are disposed to characterize data flow or traffic in the network that relates to the endeavor. The captured metadata may be stored and analyzed. Based on the metadata analysis, one or more extensions of recognized available data may be discovered. The recognized data extensions include standard data protocols and/or specifications. The available extensions are updated for use in searching and presenting data. An example embodiment of the present invention relates to a non-transitory computer readable storage medium that comprises tangibly encoded instructions, which when executed by a computer system processor, cause, control, program or configure the computer system to perform this process.

An example embodiment of the present invention relates to a computer system for processing information, which is relevant analytically to an endeavor of a user. The computer system includes multiple listeners, which monitor data flow and transactions over an data center. The data center includes multiple information sources. In monitoring the data flow, information that has contextual relevance to users of the data center may be "heard," e.g., detected. One or more loaders may identify, within the contextually relevant information, a recognized data extension that is not currently stored or used in the computer system. A data engine organizes, processes and stores the contextually relevant information. The one or more loaders automatically update the data engine with the contextually relevant information that has the newly recognized data extension. An application server accesses the organized, processed stored contextually relevant information from the data engine. A GUI allows a user to input a query over the data engine and provide a presentation thereto of data that is returned in response to the query. The data that is returned in response to the query may include the updated data, which has the newly recognized data extension.

An example embodiment of the present invention relates to a computer system for processing information, which is relevant analytically to an endeavor of a user. The computer system includes an organizer that organizes data, which is gathered in relation to the analytically relevant information into a first result that is sensitive to a context that relates to the endeavor. A GUI presents a representation of the contextually sensitive first result that is synoptic in relation thereto and, with which the user may interact. An expander expands the first synoptic representation into a second result that which includes a graphical data attribute or a numerical data attribute. The expander determines a format that represents the second result in relation to the context sensitivity and the graphical or numerical data attribute. The GUI presents a representation of the second result according to the determined representative format. The first results presentation and the second results presentation are linkable to underlying data sets that correspond to the organized data for access and presentation upon a request by the user.

An embodiment of the present invention relates to a computer implemented method for processing information, which is relevant analytically to an endeavor of a user. Data flow and transactions over an endeavor's data center are monitored. The data center has multiple information sources. The data traffic is monitored to detect Information therein, which has contextual relevance to users of the data center. Within the contextually relevant information, a recognized data extension may be identified that is not currently stored or used in relation to analytical operations over the contextually relevant information. The contextually relevant information is organized in a storage. The storage organization is updated automatically, based on the newly recognized data extension. The automatically updated contextually relevant information may be accessed based on a query. A presentation of the automatically updated contextually relevant information is provided in response to the query. An example embodiment of the present invention relates to a non-transitory computer readable storage medium that comprises tangibly encoded instructions, which when executed by a computer system processor, cause, control, program or configure the computer system to perform this process.

An embodiment of the present invention relates to a GUI, which includes a data engine that organizes information that is contextually relevant to a user endeavor. A server accesses the contextually relevant information from the data engine. A web browser or a mobile device interface which provides multiple interactive presentations of the contextually relevant information. The interactive presentations include a synoptic presentation format of the contextually sensitive information and an expanded presentation format of the contextually sensitive information. The interactive presentations are linkable to underlying data sets that correspond to the organized data for access and presentation upon a request by the user. The GUI may include an automatic updater for the data engine. The automatic updater includes multiple listeners and one or more loaders.

The listeners monitor a flow of data types, which are recognized by an extension thereof or a protocol that corresponds thereto, in a data center that relates to the user endeavor. The one or more loaders, upon detecting that one of the recognized data types is not currently used by the data engine, automatically update the data engine. The synoptic presentation and/or the expanded presentation may link to the underlying data sets based on the update.

BRIEF DESCRIPTION OF THE DRAWINGS

Embodiments of the present invention are illustrated by way of example, and not by way of limitation, in the figures of the accompanying drawings, and in which like identifying reference numerals refer to similar elements and features of example embodiments described herein and in which:

FIG. 2A and FIG. 2B depict screenshots of example workspace notations, according to an embodiment of the present invention;

FIG. 3A, FIG. 3B and FIG. 3C depict screenshots of example summary visual units, according to an embodiment of the present invention;

FIG. 4 depicts a screenshot of an example table representation, according to an embodiment of the present invention;

FIG. 6 depicts a screenshot of an example drill-through from a table, according to an embodiment of the present invention;

DESCRIPTION OF EXAMPLE EMBODIMENTS

Figure 1:
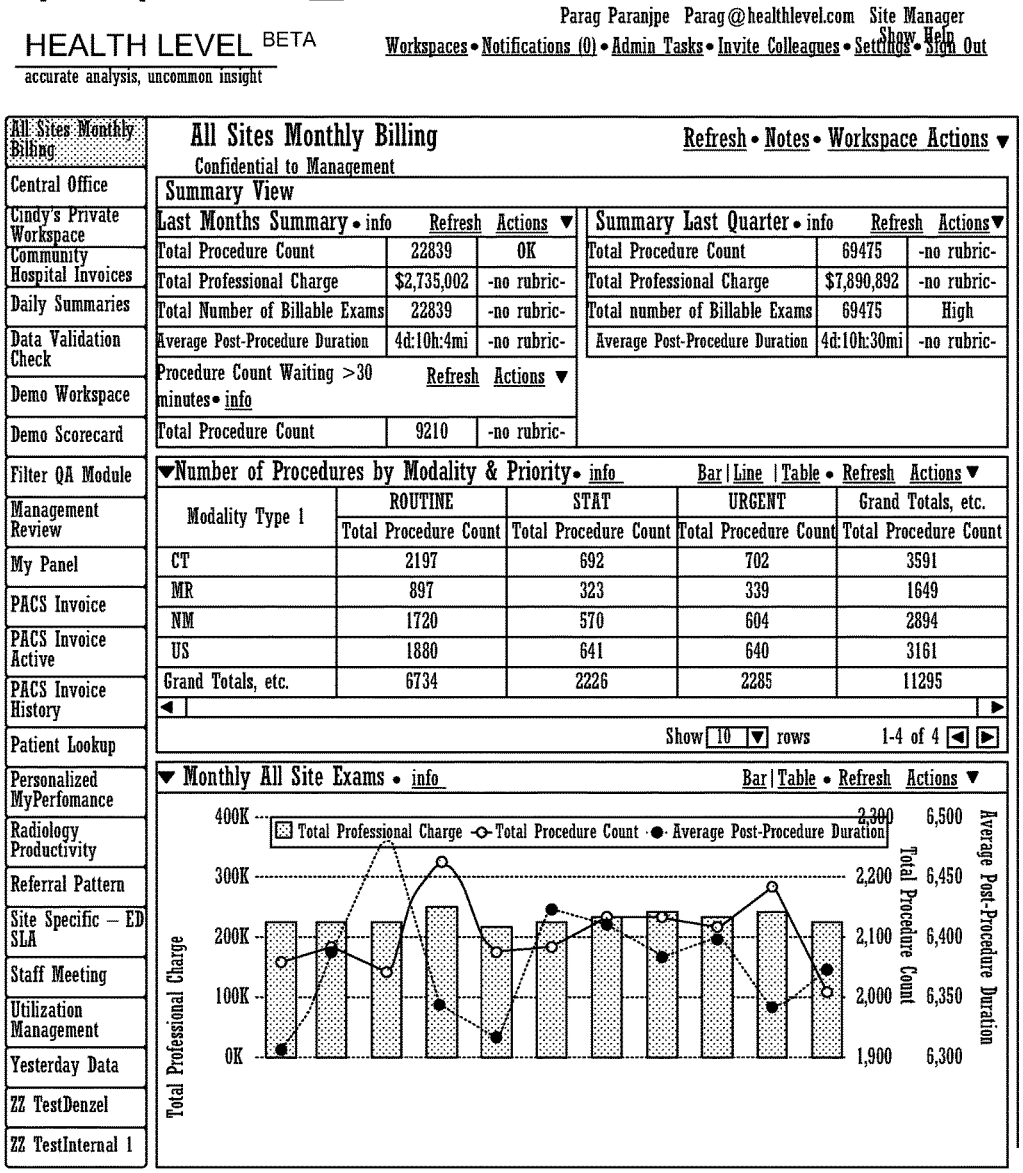
FIG. 1 depicts a screenshot of an example workspace, according to an embodiment of the present invention.

Processing and presenting information is described herein. In particular, an inventive embodiment is described in relation to organizing analytically relevant information contextually for efficient presentation. In the description of example embodiments that follows, numerous specific details are set forth for the purposes of explanation in order to provide a thorough understanding of the present invention. It will be apparent to artisans of ordinary skill in fields that relate to graphics processing however, that the present invention may be practiced without some of these specifically described details. For focus, clarity and brevity, as well as to avoid unnecessarily occluding, obscuring, obstructing or obfuscating features that may be somewhat more germane and significant in explaining the present invention, this description may avoid describing some well-known processes, structures, components and devices in exhaustive detail.

Overview

An example embodiment of the present invention relates to organizing analytically relevant information contextually for efficient presentation. An embodiment of the present invention relates to processing information, which is relevant analytically to an endeavor of a user. Data that is gathered in relation to the analytically relevant information is organized into a first result, which is sensitive to a context that relates to the endeavor. A representation of the contextually sensitive first result is presented, which is synoptic in relation thereto and with which the user may interact. The first synoptic representation is expanded into a second result, which comprises one or more of a graphical data attribute or a numerical data attribute. The expansion comprises determining a format that best, or most efficiently, represents the second result in relation to the context sensitivity and the graphical or numerical data attribute. A representation of the second result is presented according to the determined best or more efficient format. The first results presentation and the second results presentation are linkable to underlying data sets that correspond to the organized data for access and presentation upon a request by the user.

The second result representation format may comprise a table for presenting the numerical data attribute and/or a chart for presenting the graphical data attribute. The synoptic representation and the second result representation comprise a workspace. A level of the contextual sensitivity, a characteristic of the contextual sensitivity and/or the format that represents the second result is controllable by an interaction with the user. In an example embodiment, the user-controllable interaction comprises an input to a graphical user interface (GUI) and/or a web browser. The GUI or browser may comprise a palette, which presents for selection by the user, one or more measures or filters that correspond to a feature or event, which is captured or recorded from a network that is related to the endeavor. The palette presents the measures or the filters based on metadata. The metadata are captured by multiple listeners, which are disposed to characterize data flow or traffic in a network that relates to the endeavor. The captured metadata is loaded into storage such as a database, data warehouse, BI milieu or the like.

Embodiments of the present invention allow users, who may lack special computer expertise, to express deep analytical questions in a browser-based interface and get the answer in the same interface. The web browser interface may be adapted, in a format that may differ from the web browser in one or more respects, in a mobile user interface such for use with telephones or a personal digital assistant (PDA), e.g., on which display screens range 2 inches or so by 4-5 inches or so. The web browser interface may be adapted to tablets as well, e.g., on which display screens comprise areas of about 50 square inches or so. In an example embodiment, the web browser and mobile user interfaces comprise one or more interactive GUI screens, such as those that are described with reference to example "workspace" screenshots shown in FIG. 1-FIG. 7, inclusive, below.

Example Workspace Screenshots

Embodiments of the present invention allow users to make effective use of the information they are provided, by organizing the information into collections of related contexts, which are displayed in workspaces. FIG. 1 depicts a screenshot of an example workspace 100, according to an embodiment of the present invention. As used herein, the term 'workspace' relates to a collection of interactive summary information and more detailed, 'expanded' interactive information collections, which comprise tables for numerically characterized data and charts for graphically characterized data. Workspaces provide logically context-related analytical output in a simple and easy to use manner.

Figures 2A, 2B:
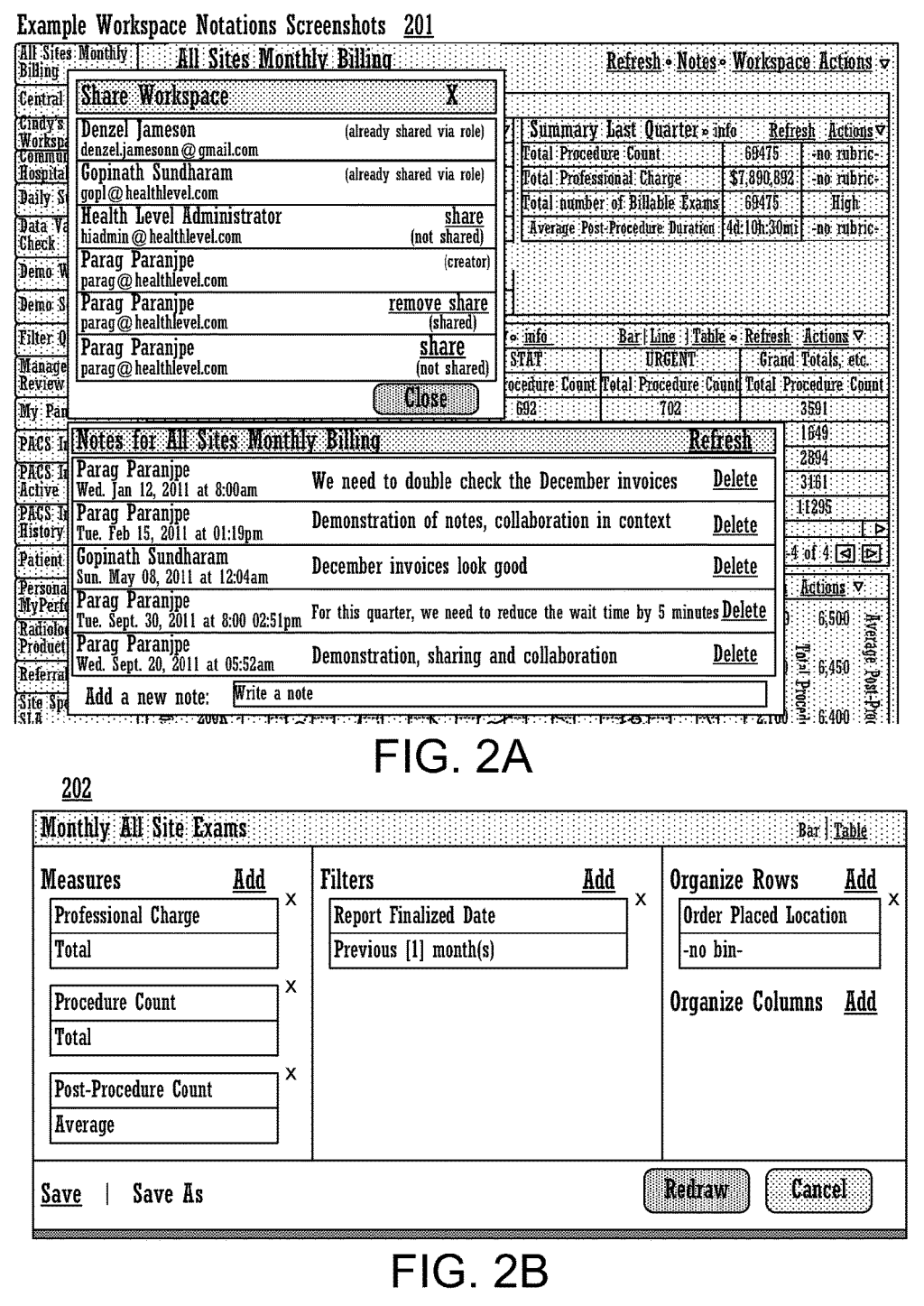

Embodiments of the present invention allow users to share and collaborate in relation to analytical output in a single virtual space, e.g., with notes attached to workspace. FIG. 2A and FIG. 2B depict screenshots of example workspace notations 201 and 202, respectively, according to an embodiment of the present invention. Users have the capability to annotate. e.g., write notes in, the workspace itself.

Embodiments allow visual units, e.g., analytical output, to be annotated by users. Such user markups 'directly on' the analytical output and thus, effectively take snapshots for immutability. FIG. 3A and FIG. 3B depict screenshots 301 and 302, respectively, of example summary visual units, according to an embodiment of the present invention. Data analytics, correlations and reporting makes data useful to end users for decision making. However, users (perhaps experts in one or more other fields) who may lack one or more significant skills in computer science, database and/or network administration and information technology (IT) may pose queries, or ask questions, inefficiently in a business related language.

Embodiments of the present invention essentially walk such users through significant such business thought processes. For example, embodiments of the present invention essentially guide users to think about that, which they would like to measure, how much data they would like to use, and how they would prefer to organize their query results and related information.

As seen in FIG. 3B for example, workspace 302 essentially guides users with its layout to ask questions intuitively and easily and, as well, to change or update queries based on results, which may be returned in relation to previous queries. Thus, within a workspace any user that asks analytical questions should be able to understand the answers returned in relation thereto in a simple, brief, intuitive and context-sensitive format. As shown in FIG. 3A, an example embodiment is implemented wherein summary, e.g., synoptic, information is tied to more detailed analysis thereof and wherein a corresponding summary visual unit 301 "floats" to a top or upper position for display in the workspace.

In creating analytical summaries, an example embodiment distinguishes between a summary and detailed analytics. Thus, an example embodiment programs metadata and process, e.g., algorithm, flow so that if a row and column organization is not applied, then the analytics is called a summary analytical unit. As shown in FIG. 3C for example, the content for Row or Column organization are empty in screenshot 303; thus their results comprise scalar values, which are returned to represent summaries.

Summary visual units however may not suffice to efficiently present numerical data and more detailed, exact or complex information. Thus, an example embodiment expands the synoptically presented information into a more detailed visual unit, which may be implemented with generation of a table. Tables represent numerical data in significant detail. FIG. 4 depicts a screenshot of an example table presentation 400, according to an embodiment of the present invention. An example embodiment generates a table, e.g., responsive to a query on a synoptic workspace, by drilling through to extract deeper data, guided by metadata or links that unify the data represented by each workspace contextually. An example embodiment may be implanted wherein new visual units, by default, are created as tables.

As used herein, the terms "link," "linked," "linking" and the like relates to storing one or more metadata based or other pointers to deeper underlying information that relates contextually to data presented on a workspace in a repository such as a database or data warehouse or BI library or other functionality, storing one or more universal resource locators (URL) of one or more locations that contain such deeper underlying information in a repository such as a database, etc. As used herein, the term "links" may refer to retrieving the deeper, underlying data from one or more pointers stored in a database, etc., from one or more files, which may be referred to by the database, or from one or more database references stored therein.

Figure 5:
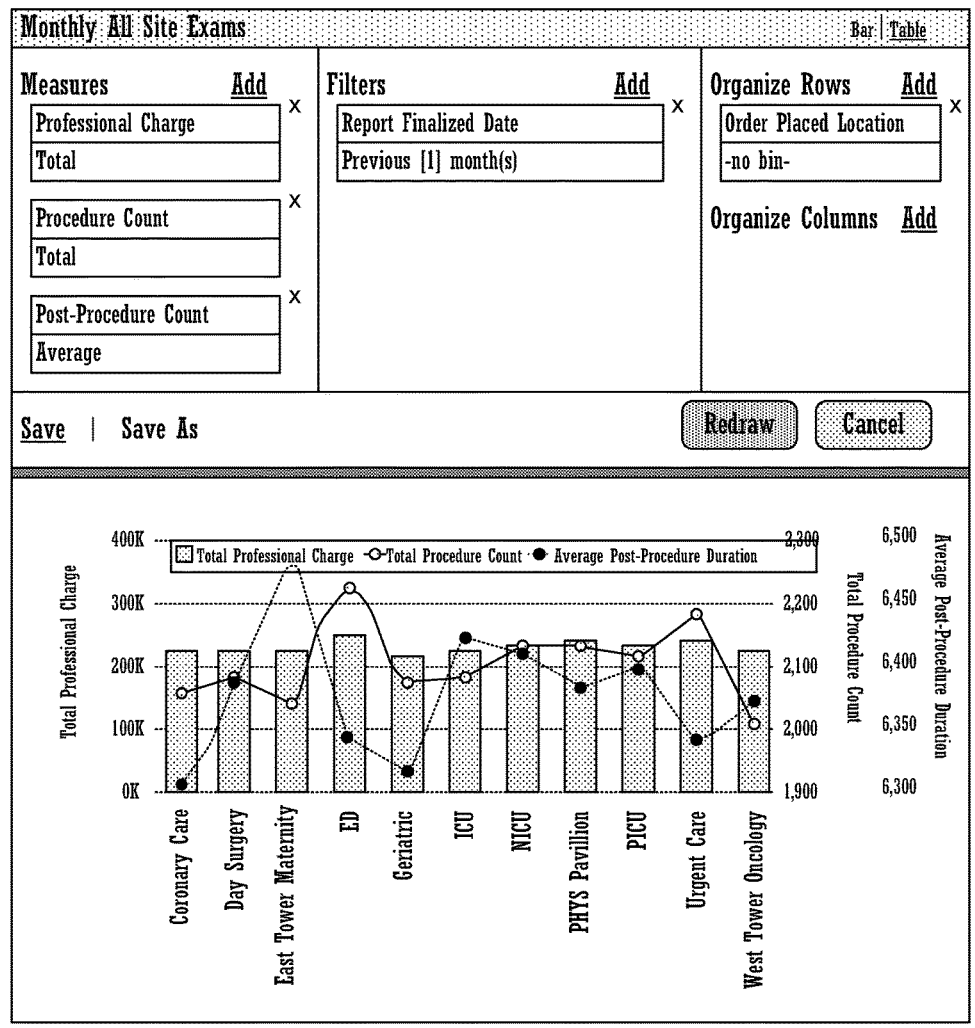
FIG. 5 depicts an example chart presentation, according to an embodiment of the present invention.

As table presentations not suffice to spot or find patters efficiently, an embodiment may compute a rendering of graphical data in a chart presentation, which may comprise line, bar and pie graphs and other charts that may better display graphical information. FIG. 5 depicts an example chart presentation 500, according to an embodiment of the present invention. In creating charts from underlying data, an example embodiment computes a kind, type, style or format for a chart presentation to best the underlying display the data graphically. Computing chart presentations may be based on corresponding metadata and/or characteristics of the organization of the underlying data. An embodiment may be implemented wherein chart presentations are computed according to the example pseudo code, shown in Table 1, below.

TABLE 1

VU Type - Single measure, single dimension - row or column
Pie chart - simple pie distribution
Line chart - simple single line - x axis represent dimension, y axis measure value
Bar chart - simple bar - x-axis represent dimension by value name, y axis represents measure value
Stacked Bar - N/A, simple bar is a subclass of stacked bar - with one category only
VU type - Single measure, single row level, single column level: Sort by dimension cardinality
Pie chart - N/A TABLE 1-continued Line chart - (default) lowest dimension cardinality is # of lines, largest dimension
cardinality is x axis, y axis is measure value
Bar Chart - (default) lowest dimension is # of bar stacks, largest dimension cardinality is x axis, y axis is measure value
Simple bar - N/A
VU Type - Single measure, 2 level row set, 1 level column set: Sort all three dimensions on cardinality (R1-P, R2-Q, C1-R)
VU type - Single measure, 2 level column set, 1 level row set: Sort all three dimensions on cardinality (R1-P, C12-Q, C2-R)
Pie chart - N/A
Simple Bar - N/A
Line Chart - N/A (not until 3-axis line display)
Stacked and Grouped Bar Chart - stacks are of the lowest cardinality, groups are of the second lowest cardinality, X axis is of highest cardinality
VU Type - Single measure, 2 level row set, 2 level column set: Sort all three dimensions on cardinality (R1-P, R2-Q, C1-R, C2-S)
Pie chart - N/A
Simple Bar - N/A
Line Chart - N/A (not until 3-axis line display)
Stacked and Grouped Bar Chart - stacks are of the lowest cardinality, groups are of the second lowest cardinality, X axis is of de-normalized highest cardinalities
2 or Multiple measures, single row or column level:
Line graphs: Dual scale graphs
Pie, Bar: N/A
Y-Value - always the measure value range
X-axis - column dimension (e.g. column comparison)
Stacks - Smallest cardinality dimension (e.g. modality binning CT, MR, CR, other),
Groups - next most frequent dimension
Ability to switch between stacks, groups, X-axis dimension - easily - point/click or select An example embodiment implements a drill-through functionality, which increases an analytical trust factor behind the data. FIG. 6 depicts a screenshot 600 of an example drill-through from a table, according to an embodiment of the present invention. A user may interact with the table, e.g., by clicking on any number that appears in the displayed visual unit, such as the example data "22839," shown highlighted by a surrounding oval in screenshot 600. This action causes the browser GUI to link to, access and render the deeper, underlying raw data that is contextually related to the query number "22839," etc.

Figure 7:
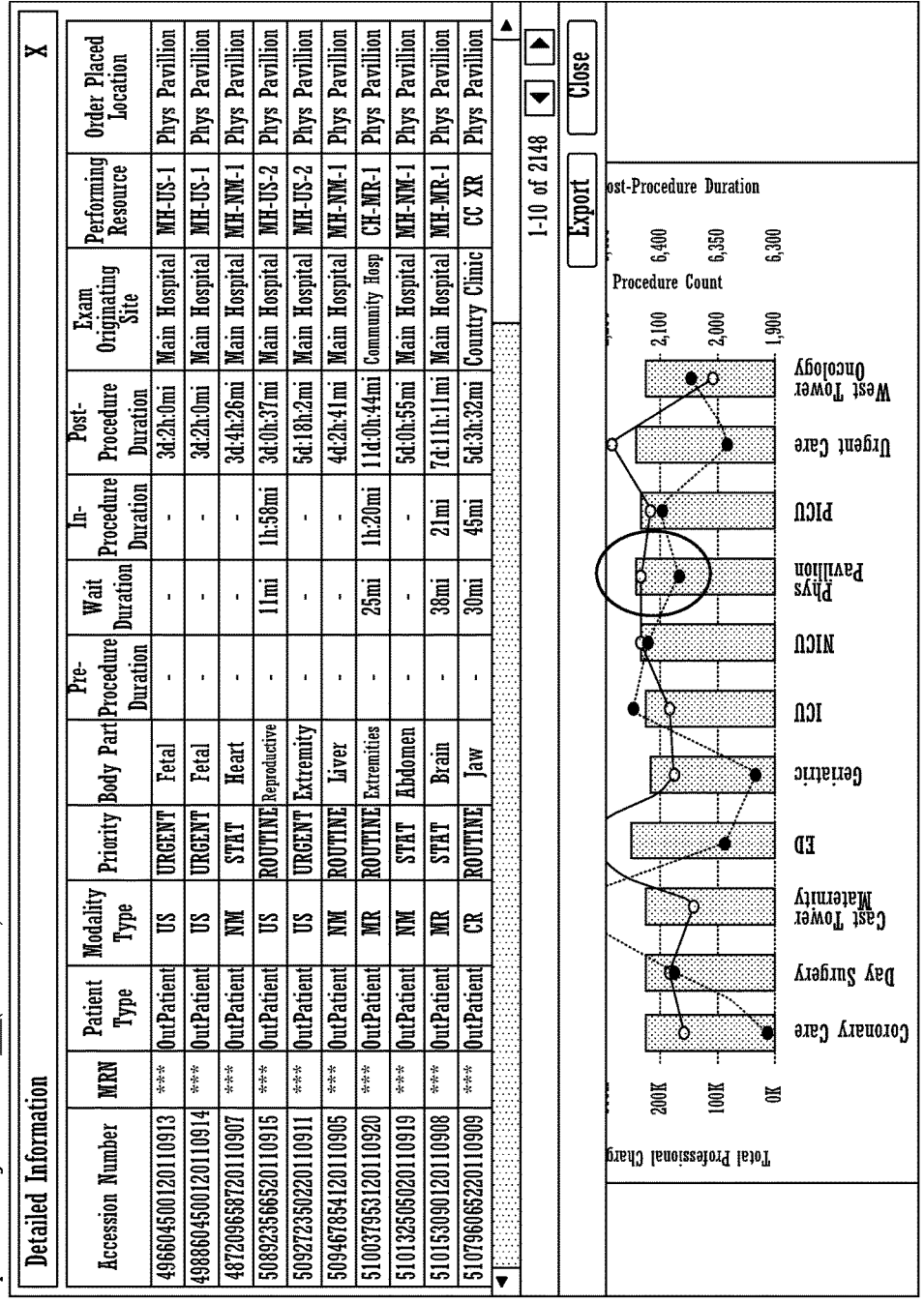
FIG. 7 depicts a screenshot of an example drill-through from a chart, according to an embodiment of the present invention.

FIG. 7 depicts a screenshot 700 of an example drill-through from a chart, according to an embodiment of the present invention. Clicking on any graphical feature shown in screenshot 700, e.g., the graph feature shown highlighted by a surrounding oval in screenshot 700 causes the browser GUI to link to, access and render the deeper, underlying raw data that is contextually related to that graph feature. A user may export the raw data, e.g., by clicking the 'Export' radio buttons, which are shown on the browser in screenshots 600 and 700.

An example embodiment allows users to change information presented in a chart, or the chart format. From displayed row and column organization parameters, users may select X axis, Y axis, bar, stack and group parameters, with which the chart may be adjusted as desired. As a user selects a displayed parameter, its corresponding dimension attribute and display characteristic changes, which guides users to their desired end results. An example embodiment generates the GUI described above with reference to the screenshots depicted in FIG. 1-FIG. 7, inclusive according to one or more of example processes running on one or more example systems, which are described below with reference to FIG. 8-FIG. 12, inclusive.

Example Network Environment

Figure 8:
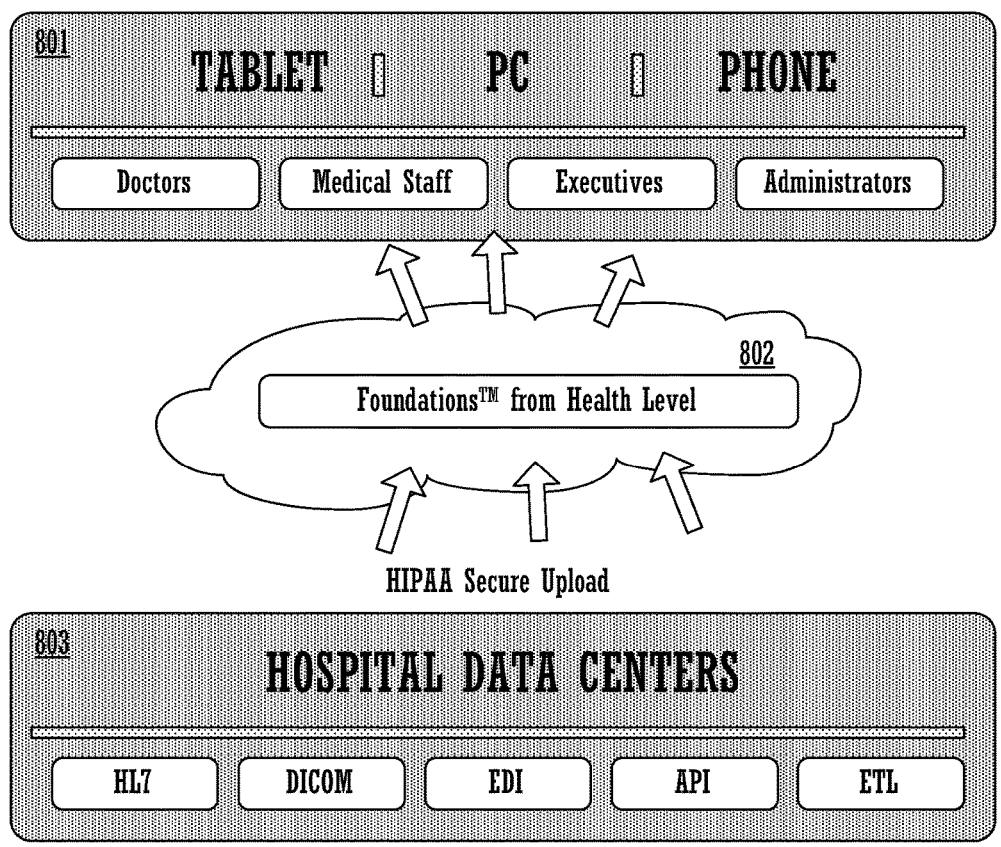
FIG. 8 depicts an example endeavor network milieu, according to an embodiment of the present invention.

FIG. 8 depicts an example endeavor network milieu 800, according to an embodiment of the present invention. The example milieu 800 has a network 803 of hospital data centers designated (arbitrarily herein) "HL7," "DICOM," "EDI," "API" and "ETL." Designators may also identify departments, such as radiology, surgery, psychiatry, emergency, billing, accounting and the like. A network 801 of users, e.g., doctors, staff, executives and administrators who may characterize the information consumers in such an environment, access and render information from hospital data centers 803 on a variety of platforms, such as workstations and personal computers (PC), tablet computers and smart phones. An example embodiment of the present invention functions within a metadata driven database network 802 to present deep data, underlying in the hospital data center network 803, to the network of users 801 in an interactive browser based GUI, e.g., as described above with reference to FIG. 1 through FIG. 7, inclusive.

While embodiments are described herein in relation to presenting hospital data center information and to related medical users, this description is to be understood as explanation, and not by any means limiting. On the contrary, embodiments of the present invention are well suited to function to present information contextually from any data center to any group of users. Thus, as used herein, the term "endeavor" may relate to any enterprise or organization, large or small, commercial, industrial, maritime, military, academic, financial, government, institutional, or the like. As used herein, the term 'data center' may relate to any database, database network, data warehouse, BI library, SAN, NAS repository or the like.

Example Computer Systems

Figure 9A:
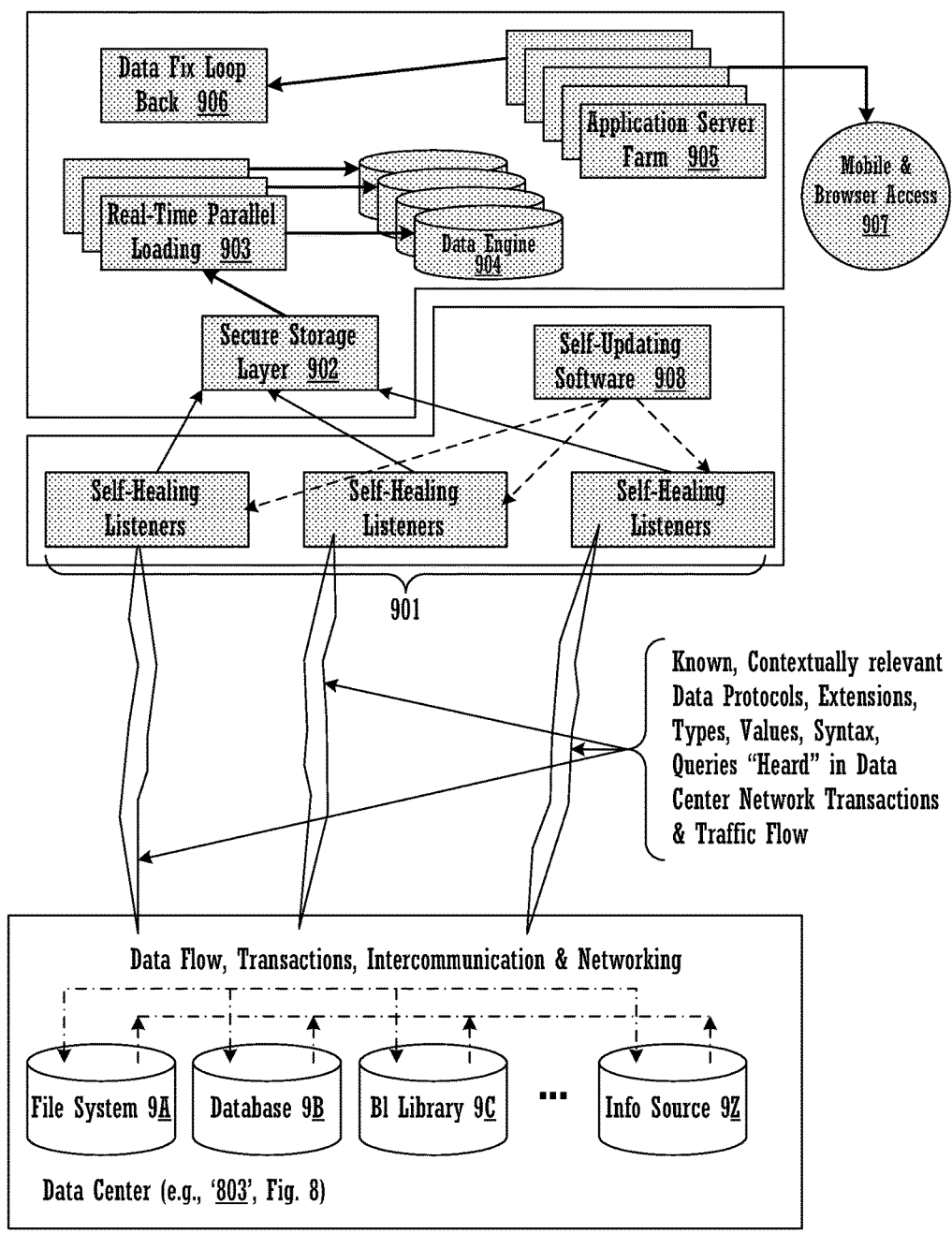
FIG. 9A and FIG. 9B depict an example computer system, according to an embodiment of the present invention.

FIG. 9A depicts an example computer system 900, according to an embodiment of the present invention. Multiple "listeners" 901 monitor the information that is stored and transacted in a data center. The listeners 901 use self-updating software 908 and may listen for specific data, transactions and queries or may be updated to broaden or change their target data. Raw data characteristic gathered by the listeners 901 are pushed up, first into a secure storage layer 902.

Loaders 903 provide real-time parallel loading of metadata, which characterizes the underlying raw data, into a data engine 904. Data engine 904 categorizes, organizes, aggregates and stores the metadata. Listeners 901, loaders 903 and data engine 904 allow system 900 to automatically discover extensions of the recognized data, e.g., via standard data specifications, protocols, extensions or data types, etc. Data engine 904 updates the available extensions for use in searching and displaying data. An application server farm 905, in response to a query or the like from a browser or mobile based GUI, returns an information presentation therewith, based on values, measures and filters that correspond to the metadata. The metadata comprise a name, definition and category, and a measure or filter.

Figure 9B:
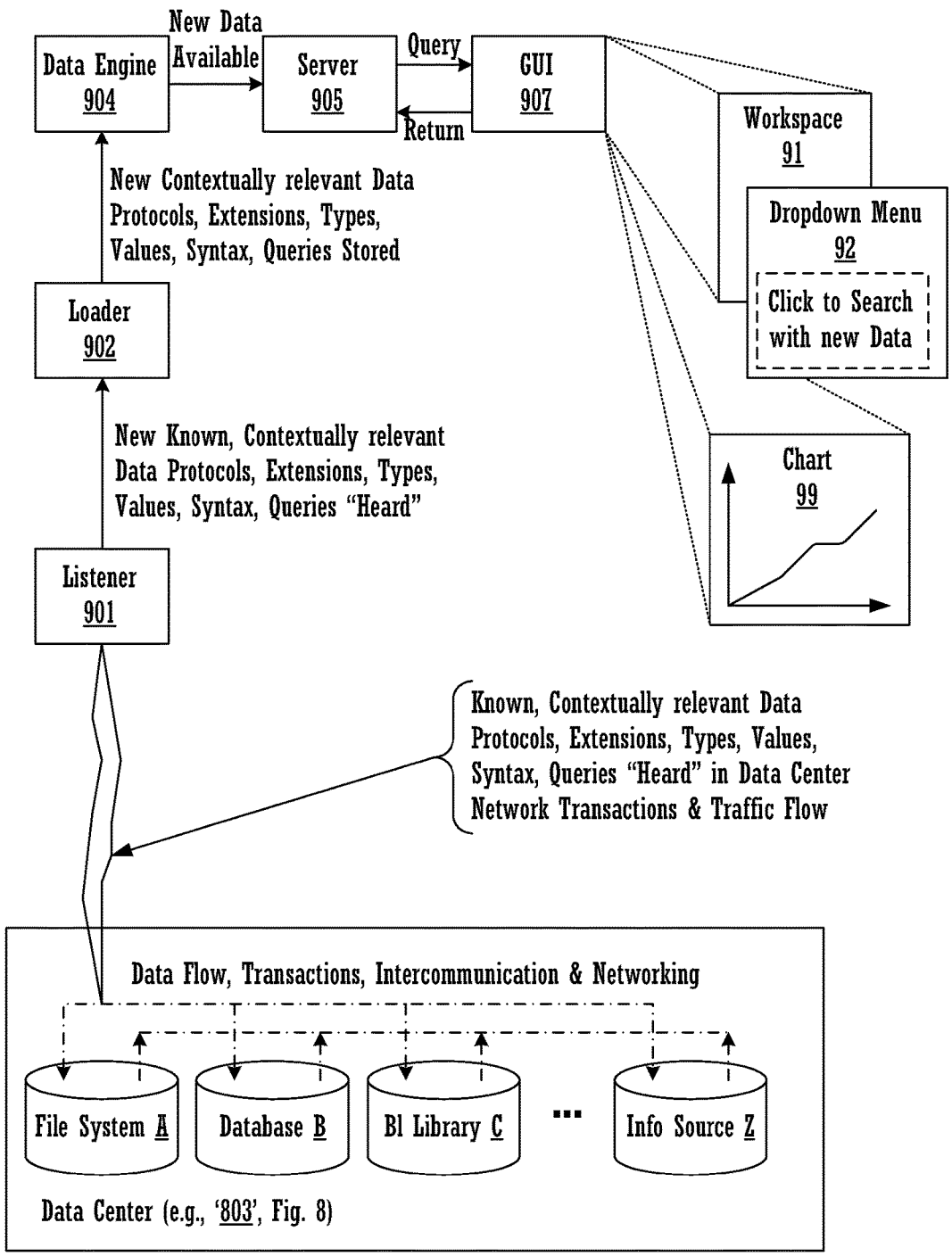

FIG. 9B depicts example computer system 900, according to an embodiment of the present invention. In FIG. 9B, an example function of computer system 900 is shown. Listeners 901 monitor the various sources of information within a data center (e.g., '803', FIG. 8). Various information sources interact and intercommunicate within the data center, e.g., over networks disposed therewith. The information sources may include any of a variety of data producers, exchangers and consumers, which comprise elements of the data center. For example, FIG. 9B shows a file system A, a database B, a BI library C and another information source Z to illustrate any number of information sources.

As the information sources interact, transact and communicate, listeners 901 "hear," e.g., detect and characterize, components of the data flow traffic therein according to their characteristics as known, contextually relevant data protocols, extensions, types, values, syntax, etc. From time to time, listeners 901 will hear "new" known, contextually relevant data; e.g., "new" in the sense that, while recognized by their protocols, extensions, types, values, syntax, etc., they have not yet been stored, processed or organized by data engine 904. Loaders 902 load the newly recognized data into the data engine 904, thus automatically updating computer system 900 with information that server 905 may make available to browser/mobile GUI 907.

GUI 907 may now provide users with a workspace 91, with which they may access and use the newly recognized information. For example, workspace 91 may render the new data accessible via a drop-down menu, pop-up menu, or similarly selectably interactive feature such as a line or a radio button, which may be clicked or otherwise actuated to query server 905. Based on the query, server 905 returns a response, accessed from data engine 904. GUI 907 may then present the new information to users based on the query response as chart 99 for graphical data, or as a table for numerical data.

Figure 10:
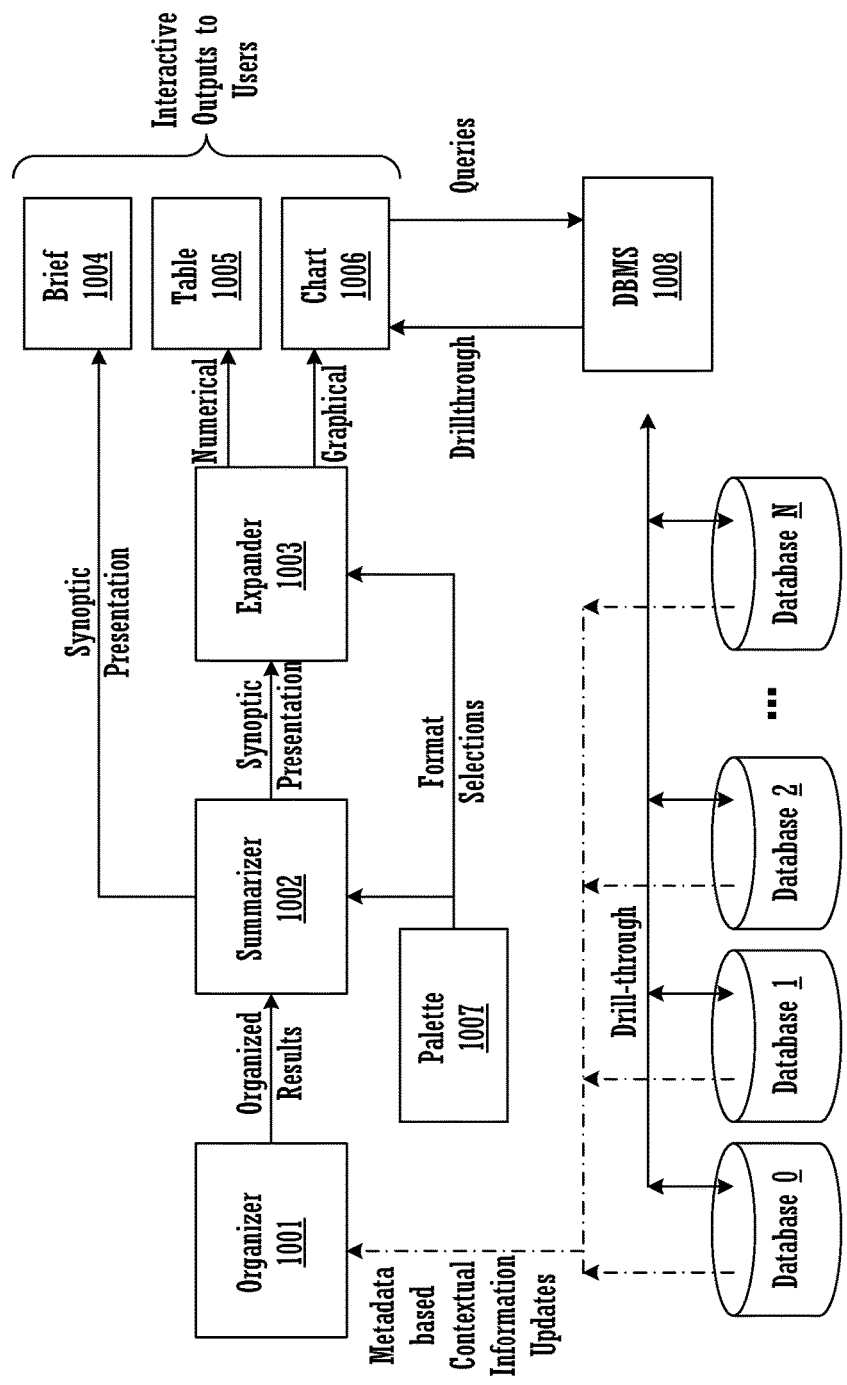
FIG. 10 depicts an example computer system, according to an embodiment of the present invention.

FIG. 10 depicts an example computer system 1000, according to an embodiment of the present invention. System 1000 has a database management system (DBMS) 1008, which may comprise network of any number of data repositories; four (4) repositories: database 0, 1, 2 and N are shown, wherein 'N' denotes, e.g., represents, an integer greater than two (2). In an example embodiment, DBMS 1008 corresponds to data engine 904 (FIG. 9). DBMS 1008 automatically discover extensions of the recognized data, e.g., via standard data specifications. DBMS 1008 updates the available extensions for use in searching and displaying data.

Using metadata based contextual information updates, an organizer module 1001 organizes raw data into organized results. A summarizer module 1002 renders a synoptic presentation 1004, such as a summary workspace, which provides an interactive, brief summary or synopsis of the information to a browser or mobile based GUI for a user. An expander module 1003 expands the synoptic presentation into a more detailed presentation.

Numerical data are rendered for presentation by the GUI as an interactive table 1005. Graphical data are rendered for presentation by the GUI as an interactive chart 1006. A palette 1007 allows users to adjust or change the measures and filters based on the metadata, as well as to the format of the presentations/workspaces. Queries made by clicking features of summary 1004, table 1005 and chart 1006 trigger a drill-through function to return deep, underlying raw data for presentation by the GUI.

Example Computer Implemented Processes

Figure 11:
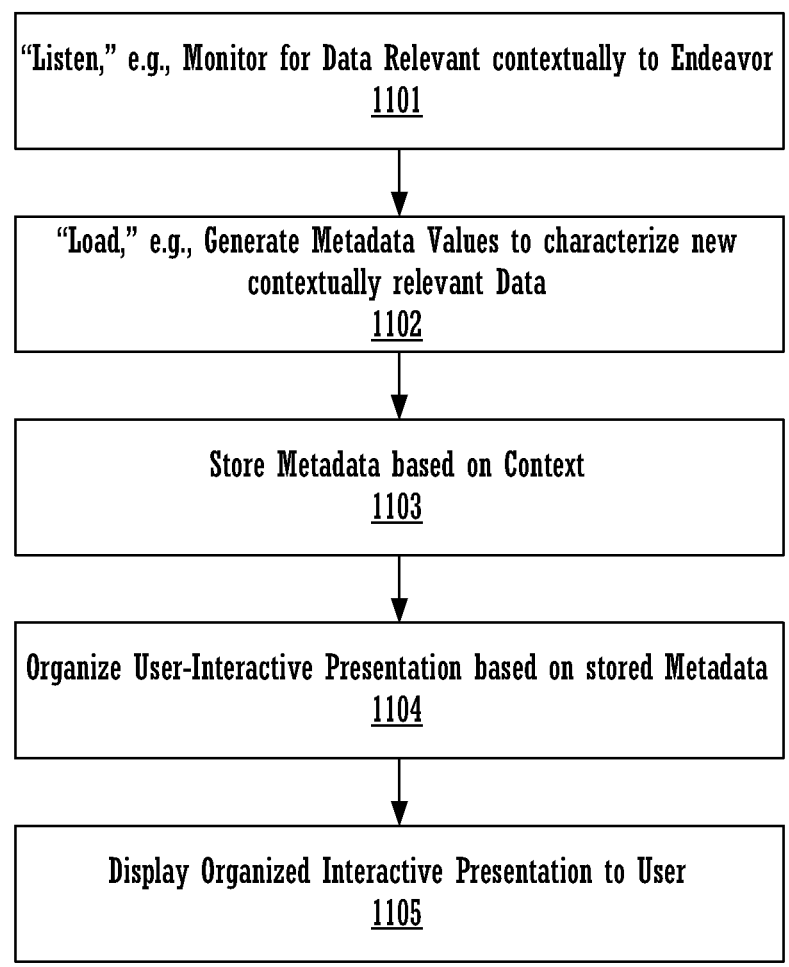
FIG. 11 depicts a flowchart for an example computer implemented process, according to an embodiment of the present invention.

The GUI described with reference to the example screenshots above and/or systems 900 (FIG. 9) and 1000 (FIG. 10) may function according to algorithmic instructions, executing on a processor. FIG. 11 depicts a flowchart for an example computer implemented process 1100, according to an embodiment of the present invention. Listening function 1101 monitors for data that is relevant contextually in relation to an endeavor. Loading function 1102 generates metadata values to characterize "new" contextually relevant data; e.g., data that is recognized by their protocol, extensions, types, values, syntax, queries, etc., which allows automatic updating. The metadata are stored by an storage function 1103 based on the context. An organizer function 1104 renders a user-interactive presentation based on the stored metadata. The organizer function automatically discover extensions of recognized data, e.g., via standard data specifications and updates the available extensions for use in searching and displaying data. An interactive display function displays the interactive workspaces, summaries, charts, and tables for users.

Figure 12:
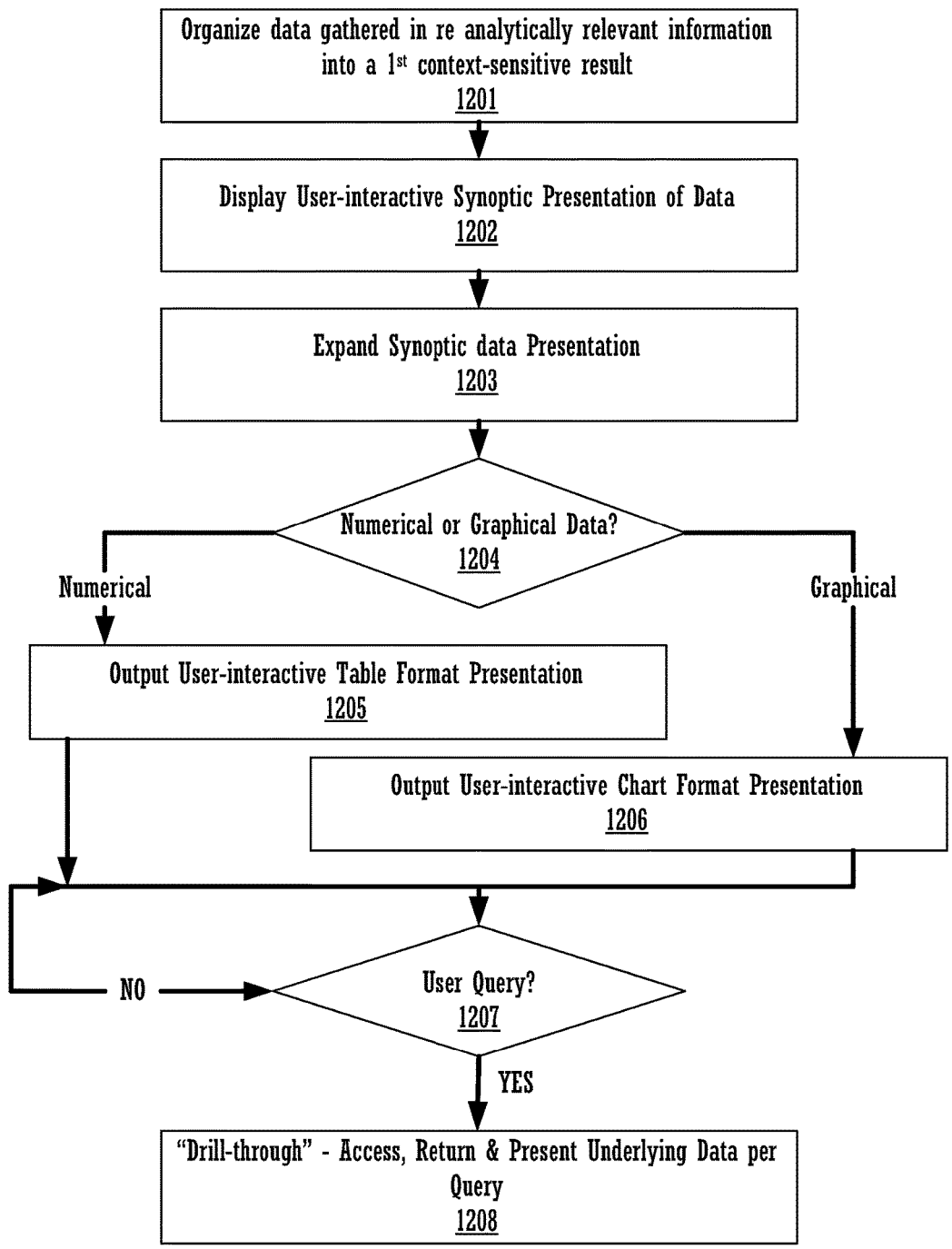
FIG. 12 depicts a flowchart for an example computer implemented process, according to an embodiment of the present invention.

FIG. 12 depicts a flowchart for an example computer implemented process 1200, according to an embodiment of the present invention. An organizer function 1201 organizes data, which is gathered in relation to analytically relevant information, into a first context-sensitive result. In an embodiment, process 1200 functions with automatically discover of extensions of recognized data, e.g., via standard data specifications and updates the available extensions for use in searching and displaying data. A presentation function 1202 displays an interactive synoptic presentation of the data for a user. An expansion function 1203 expands the synoptic data presentation.

A characterizer function 1204 characterizes the expanded data as numerical data or graphical data. A presentation function 1205 outputs numerical results in a user-interactive table format. A presentation function 1206 outputs graphical results in a user-interactive chart format. Based on an input from a query function 1207, a drill-through function 1208 accesses, returns, renders and presents deep, detailed information, which underlies the synoptic or expanded data.

EQUIVALENTS, EXTENSIONS,
ALTERNATIVES AND MISCELLANEOUS

Example embodiments relating to organizing analytically relevant information contextually for efficient presentation are thus described. In the foregoing specification, embodiments of the present invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A computer system comprising:
   a processor;
   a network circuit; and
   memory coupled to said processor and comprising instructions that, when executed by said processor, cause the processor to process information, wherein the instructions implement:
      a plurality of listeners configured to: monitor data flow over a data center comprising a plurality of information sources; and detect information that has contextual relevance to users of the data center based on one or more of protocol, extensions, types values, syntax and/or queries associated with the data flow;
      one or more loaders configured to identify new contextually relevant information that is not currently stored or used in the computer system based on metadata associated with raw data of the new contextually relevant information;
      a data engine configured to process the new contextually relevant information, wherein the one or more loaders are further configured to automatically update the data engine with the new contextually relevant information;
      an application server configured to access the new contextually relevant information from the data engine; and
      a graphical user interface (GUI) configured to present data in a selected format responsive to a user query over the data engine.

2. The computer system as recited of claim 1 wherein the data presented in the GUI is associated with the new contextually relevant information.

3. The computer system as recited of claim 1, wherein the one or more loaders are configured to load the metadata associated with the raw data of the new contextually relevant information to the data engine.

4. The computer system as recited of claim 3, wherein the metadata comprises one or more of a name, definition, category, a measure and a filter.

5. The computer system as recited of claim 1, wherein the one or more loaders are further configured to generate metadata values to characterize contextually relevant information.

6. The computer system as recited of claim 1, wherein the data engine is further configured to automatically discover extensions of the new contextually relevant information via standard data specifications.

7. The computer system as recited of claim 1, wherein the instructions further implement:
   an organizer module configured to organize the raw data into organized results;
   a summarizer module configured to render a synoptic presentation of the raw data; and
   an expander module configured to expand the synoptic presentation into a detailed presentation.

8. The computer system as recited of claim 1, wherein the selected format comprises one of a user-interactive table and a user-interactive chart.

9. A non-transitory computer readable storage medium that comprises tangibly encoded instructions, which when executed by a computer system processor, implement a method of processing data, the method comprising:
   monitoring data flow of a data center comprising a plurality of information sources;
   detecting contextually relevant information from the data flow based on one or more of protocol, extensions, types, values, syntax, and/or queries associated with the data flow, wherein the contextually relevant information has contextual relevance to users of the data center;
   identifying new data of the contextually relevant information based on one or more of standard data specifications, protocols, extensions and data types, wherein the new data is new with respect to other data stored or used in relation to analytical operations over the contextually relevant information;
   organizing the contextually relevant information in a storage;
   automatically updating the contextually relevant information with the new data in the storage;
   accessing updated contextually relevant information in response to a query and based on metadata associated therewith; and providing a presentation of the updated contextually relevant information in a selected format.

10. The non-transitory computer readable storage medium of claim 9, wherein the selected format comprises a synoptic presentation.

11. The non-transitory computer readable storage medium of claim 10 further comprising expanding the synoptic presentation into a detailed presentation in response to a user request.

12. The non-transitory computer readable storage medium of claim 11, wherein the expanding is based on metadata analysis.

13. The non-transitory computer readable storage medium of claim 12, wherein data presented in the synoptic presentation and data presented in the detailed presentation are linkable through metadata thereof.

14. The non-transitory computer readable storage medium of claim 13, wherein the metadata comprises one or more of a name, definition, category, a measure and a filter.

15. The non-transitory computer readable storage medium of claim 9, wherein the method further comprises generating metadata values to characterize the contextually relevant information.

16. A computer implemented method of processing data, the method comprising:

monitoring data flow over an data center comprising a plurality of information sources;

detecting information that has contextual relevance to users of the data center based on one or more of protocol, extensions, types, values, syntax, and/or queries associated with the data flow;

identifying new contextually relevant information that is not currently stored or used in the computer system based on metadata associated with raw data of the new contextually relevant information;

processing the new contextually relevant information;

automatically updating the data engine with the new contextually relevant information;

accessing the new contextually relevant information; and presenting data in a selected format responsive to a user query.

17. The computer implemented method of claim 16 further comprising loading the metadata associated with raw data of the new contextually relevant information to a data engine for processing.

18. The computer implemented method of claim 16 wherein the metadata comprises one or more of a name, definition, category, a measure and a filter.

* * * * *